United States Patent
Boyapati et al.

(10) Patent No.: US 11,134,402 B1
(45) Date of Patent: Sep. 28, 2021

(54) SYSTEMS AND METHODS FOR BEAMFORMING AND NETWORK OPTIMIZATION BASED ON USER EQUIPMENT USAGE DATA DERIVED FROM BATTERY DISSIPATION SIGNATURES

(71) Applicant: Verizon Patent and Licensing Inc., Basking Ridge, NJ (US)

(72) Inventors: Vamsi Krishna Boyapati, Metairie, LA (US); Kishore K. Guntuku, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/011,362

(22) Filed: Sep. 3, 2020

(51) Int. Cl.
| | |
|---|---|
| *H04W 24/02* | (2009.01) |
| *G06N 20/00* | (2019.01) |
| *H04W 16/28* | (2009.01) |
| *H04W 24/08* | (2009.01) |

(52) U.S. Cl.
CPC .......... *H04W 24/02* (2013.01); *G06N 20/00* (2019.01); *H04W 16/28* (2013.01); *H04W 24/08* (2013.01)

(58) Field of Classification Search
CPC ......... H04W 52/0261; H04W 52/0277; H04W 24/10
See application file for complete search history.

(56) References Cited

U.S. PATENT DOCUMENTS

| | | | |
|---|---|---|---|
| 2009/0190465 A1* | 7/2009 | Porat | H04L 27/2647 370/210 |
| 2016/0020936 A1* | 1/2016 | Hu | H04L 27/2657 375/260 |
| 2017/0288932 A1* | 10/2017 | Kang | H04L 27/2082 |

* cited by examiner

*Primary Examiner* — Kevin Kim

(57) ABSTRACT

A system described herein may provide a technique for the use of artificial intelligence/machine learning ("AI/ML") techniques to model User Equipment ("UE") usage information based on battery dissipation and/or other battery performance or characteristic information. A given model (or set of models) may be used to determine UE usage information, such as types of applications or services (e.g., voice calls, content streaming, web browsing, etc.) being used by UEs, amount of traffic sent and/or received by UEs, radio access network ("RAN") connection or disconnection activity, and/or other types of UE usage information. Network parameters, such as beam configuration parameters, may be modified based on UE usage information determined based on such models.

20 Claims, 8 Drawing Sheets

SYSTEMS AND METHODS FOR BEAMFORMING AND NETWORK OPTIMIZATION BASED ON USER EQUIPMENT USAGE DATA DERIVED FROM BATTERY DISSIPATION SIGNATURES

BACKGROUND

Wireless user equipment ("UE"), such as mobile telephones or other wireless communication devices, may utilize batteries, such as Lithium-ion ("Li-ion") batteries. The power derived from such batteries may be used by UEs to operate wireless transceiver circuitry, processing circuitry, etc. Different UEs (e.g., different makes, models, etc.) may make use of different batteries, with varying capacities, voltages, or other attributes.

Some wireless networks may include radios, antennas, or the like, which can implement variable beam patterns, where such variability may include different beam azimuth angles, beam widths, beam strengths, or other attributes. Some such variable wireless hardware may include Multiple-Input Multiple-Output ("MIMO") systems, in which multiple antennas may be used to modify parameters related to signal robustness, bandwidth, directionality, or the like.

DETAILED DESCRIPTION OF THE PREFERRED EMBODIMENTS

The following detailed description refers to the accompanying drawings. The same reference numbers in different drawings may identify the same or similar elements.

Embodiments described herein provide for the use of AI/ML, techniques to model UE usage information based on battery dissipation and/or other battery characteristic information. A given model (or set of models) may be used to determine UE usage information, such as types of applications or services (e.g., voice calls, content streaming, web browsing, etc.) being used by UEs, amount of traffic sent and/or received by UEs, radio access network ("RAN") connection or disconnection activity, and/or other types of UE usage information.

Some embodiments may use AI/ML techniques, or other suitable techniques, to derive geographical clustering or classification information based on UE usage information derived from battery information and/or other types of information. Some embodiments may modify network parameters, such as beamforming parameters associated with RANs, resource allocation parameters, and/or other types of parameters, in order to enhance network efficiency and the user experience of users of UEs that access the network.

Figure 1:
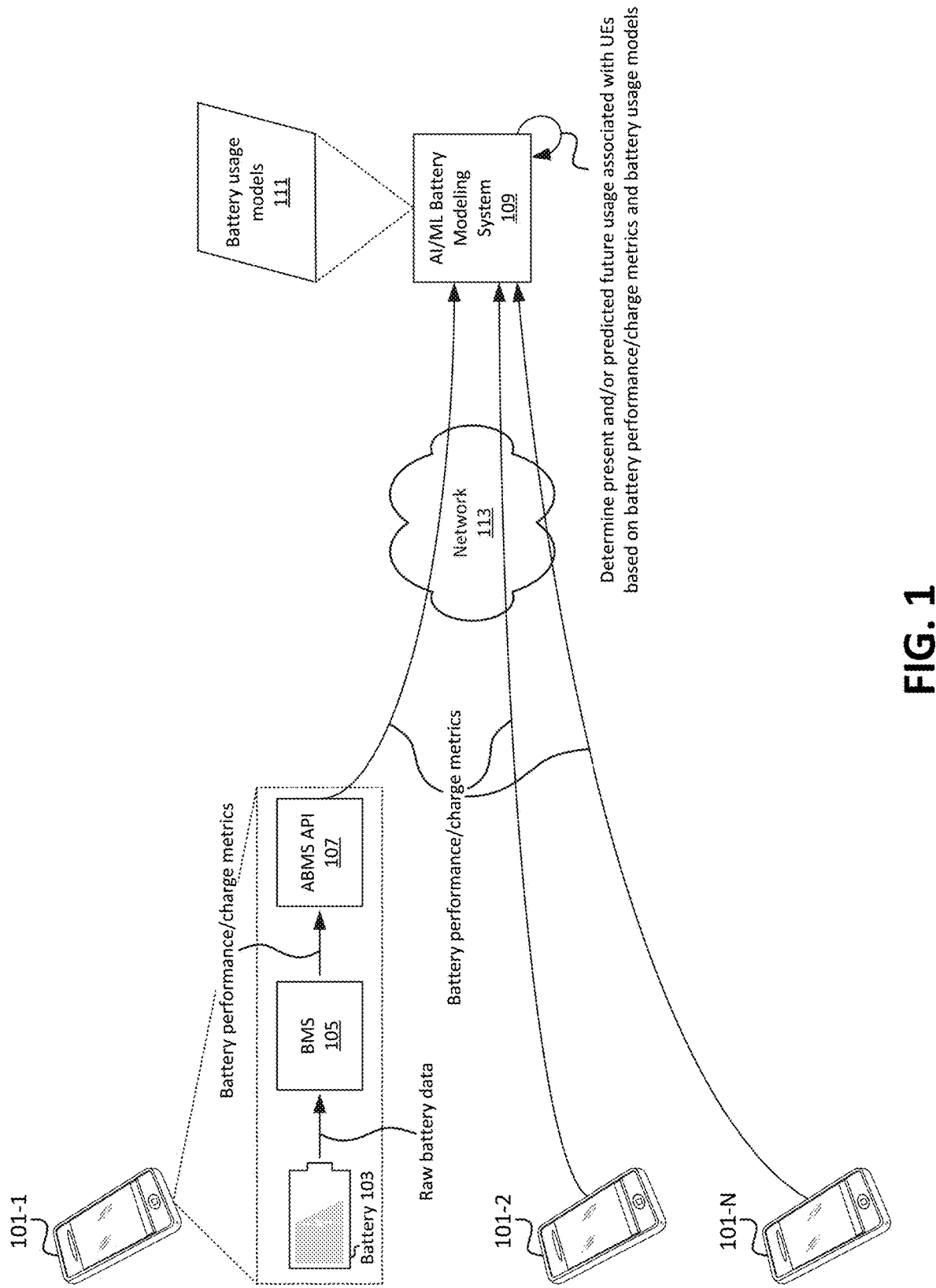
FIG. 1 illustrates an example overview of using artificial intelligence ("AI") and/or machine learning ("ML") techniques to determine usage information associated with a set of UEs based on battery information provided by the UEs, in accordance with some embodiments.

FIG. 1 depicts, for example, a set of UEs 101-1 through 101-N (referred to collectively as "UEs 101," or individually as "UE 101"). UEs 101 may include, for example, mobile telephones, tablet computers, laptop computers, self-driving vehicle systems, edge computing devices, Internet of Things ("IoT") devices, Mobile-to-Mobile ("M2M") devices, healthcare monitoring devices, and/or other types of devices. In accordance with some embodiments, each UE 101 may include a battery, a Battery Management System ("BMS"), and an AI/ML Battery Modeling System ("ABMS") application programming interface ("API"). For example, UE 101-1 may include battery 103, BMS 105, and ABMS API 107. While UE 101-1 may include other components (e.g., a display, a speaker, a microphone, wireless circuitry, sensors, and/or other components), other such components are not discussed here for the sake of brevity.

As shown, for example, battery 103 and BMS 105 may be communicatively coupled via a suitable physical interface, via which BMS 105 may receive or sense raw values relating to the state of charge ("SoC"), dissipation, heat, pressure, cooling time, and/or other battery attributes. In some embodiments, BMS 105 may also receive or generate battery configuration parameters, such as battery cut-off thresholds (e.g., SoC, heat, and/or other parameters at which the battery should shut off output power) or other battery configuration parameters.

BMS 105 may generate performance and/or charge metrics based on the received raw battery data. For example, BMS 105 may generate values or measurements that reflect the received raw battery data over discrete time intervals. For example, BMS 105 may generate performance and/or charge metrics on a per-second interval, per-half second interval, and/or some other interval. In some embodiments, BMS 105 may modify battery configuration parameters based on the received battery data. In some embodiments, BMS 105 may output the battery performance and/or charge metrics to an operating system or other component of UE 101, which may visually present some of the information (e.g., a remaining percentage of charge), and/or which may instruct BMS 105 to modify one or more battery configuration parameters.

In some embodiments, as further shown in FIG. 1, BMS 105 may output some or all of the battery performance and/or charge metrics to ABMS API 107. ABMS API 107 may be configured to communicate with ABMS 109, such as via network 113. For example, ABMS API 107 may store locator information associated with ABMS 109, such as an Internet Protocol ("IP") address, a Uniform Resource Locator ("URL"), a hostname, and/or other suitable information by which ABMS API 107 may communicate with ABMS 109. In some embodiments, ABMS API 107 may maintain authentication information, such as keys, passwords, etc., based on which ABMS 109 may authenticate ABMS API 107 (e.g., may prevent unauthorized or unwanted access to entities that do not provide suitable authentication information).

Based on the received battery performance and/or charge metrics from UE 101-1 (e.g., as received via ABMS API 107), ABMS 109 may determine one or more battery dissipation or usage signatures associated with UE 101-1 over time. For example, ABMS 109 may compare information received from UE 101-1 (e.g., from ABMS API 107) to one or more battery usage models 111 maintained by ABMS 109. Battery usage models 111 may have been generated or "trained" based on real-world and/or simulated battery performance and/or charge metrics using AI/ML techniques. For example, a Battery Lifetime Analysis and Simulation Tool ("BLAST") may be used to simulate various battery hardware, usage conditions or patterns, and/or other parameters related to stimuli or inputs that may affect battery performance and/or charge metrics.

For example, a particular battery may exhibit a particular SoC, discharge or dissipation rate, heat-related metrics (e.g., temperature), pressure-related metrics, Peukert curves, energy and/or power Ragone plots, cycle life, and/or other suitable metrics when a UE in which the battery is installed is associated with a first usage pattern (e.g., web browsing, content streaming, connecting to a Long-Term Evolution ("LTE") network, connecting to a Fifth Generation ("5G") network, repeatedly connecting and disconnecting from a network, connected to charger, not connected to charger, and/or other types of usage). A collection, derivation, representations, etc. of such performance and/or charge metrics may be referred to as a "battery signature," and AI/ML techniques may be used to correlate different battery signatures to different usage patterns.

For example, the same particular battery may exhibit a different battery signature when the UE in which the battery is installed is associated with a second usage pattern that is different from the first usage pattern. For instance, a battery installed in UE 101-1 may exhibit a first signature when UE 101-1 performs a first activity (e.g., content streaming while connected to a 5G network), and may exhibit a different second signature when UE 101-1 performs a different second activity (e.g., voice call while connected to a LTE network, file transfer while connected to a WiFi network, etc.).

Further, different batteries (e.g., different makes and/or models, which may have differing parameters such as capacity, output current, output voltage, etc.) may exhibit different performance and/or charge metrics under the same or similar usage scenarios. For example, a first battery installed in UE 101-1 may exhibit a first signature when UE 101-1 performs a particular activity (e.g., content streaming while connected to a 5G network), while a different second battery installed in UE 101-2 may exhibit a different second signature when UE 101-2 performs the same activity.

As described further below, battery usage models 111 may be associated with one or more additional factors, such as other data received from UEs 101 (e.g., sensor data, such as data received from accelerometers, barometers, gyroscopes, and/or other sensors), location data associated with UEs 101 (e.g., as received from UEs 101 or from a device or system that performs a network-based triangulation procedure to determine the respective locations of UEs 101), topographical or feature information associated with respective locations of UEs 101 (e.g., building density or layout, foliage density and/or layout, weather conditions, air quality conditions (e.g., measures of air particulates, such as a "PM2.5" value, which may indicate measures of pollution, forest fires, and/or other types of events or conditions), energy wave models and/or archetypes (e.g., which may be based on radio frequency ("RF") signals that have been detected in respective locations, and may reflect information such as frequencies of radio signals detected in respective locations, signal strength or power of radio signals detected in respective locations, consumption of radio power at base stations located in respective locations, or the like), and/or other information associated with particular geographical locations), or other suitable types of information. These additional factors may further be used to more accurately correlate UE battery signatures to respective battery usage models 111.

In some embodiments, ABMS 109 may further use "real-time" battery usage models 111, determined based on battery performance and/or charge metrics received from UEs 101, to predict future usage patterns. For example, certain types or categories of usage may be associated with future types or categories of usage, which ABMS 109 may determine using AWL or other suitable techniques. For example, ABMS 109 may determine that UEs 101 that are engaged in videoconferencing sessions, as determined based on battery signatures, at a given location (e.g., an office building) typically engage in such videoconferencing sessions for approximately one hour, and then enter an "idle" mode for approximately two hours.

Figure 2:
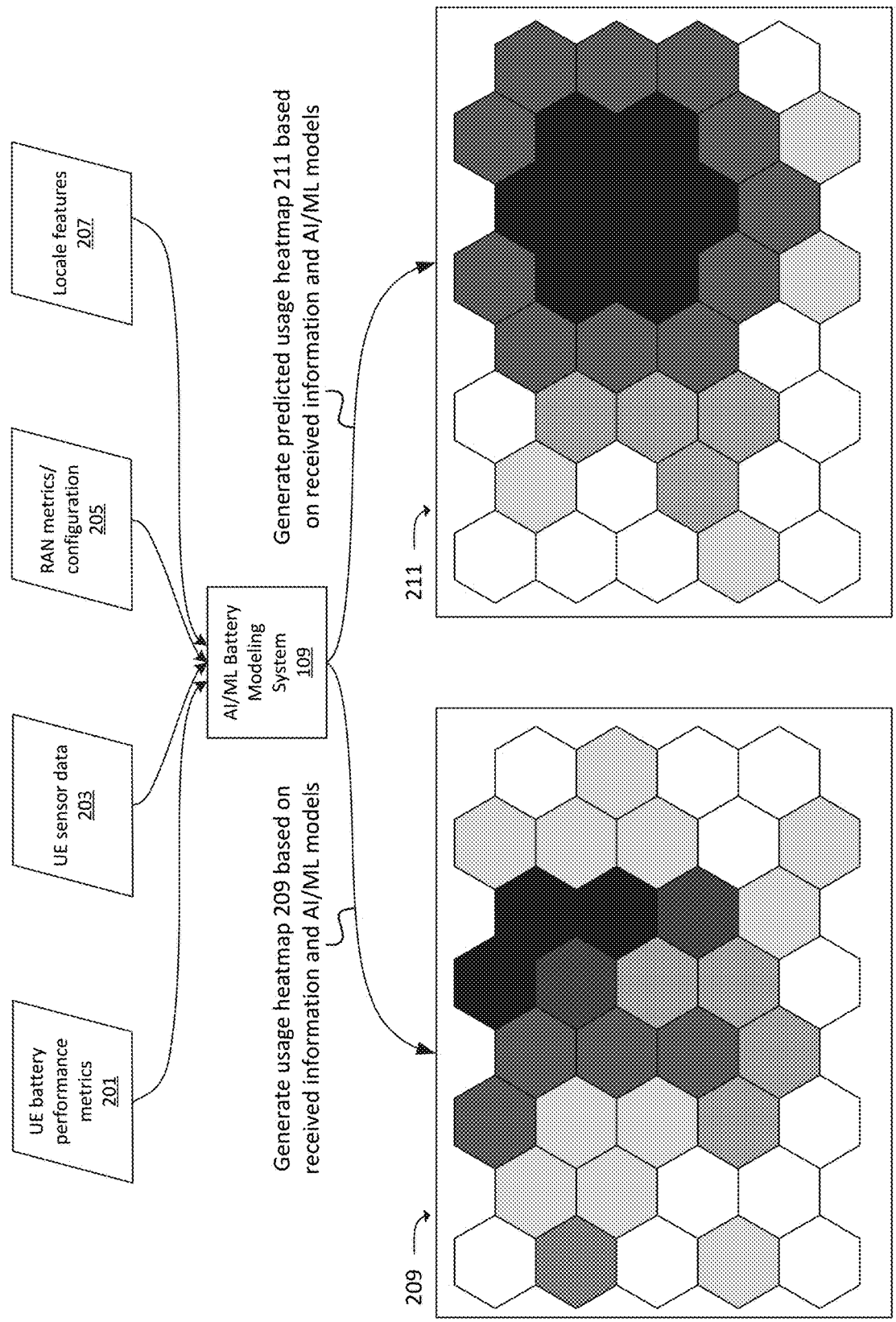
FIG. 2 illustrates an example of using AI/ML techniques to determine UE usage information associated with a geographical area and/or predict future UE usage at the geographical area, using AI/ML techniques based on UE battery information, in accordance with some embodiments.

As shown in FIG. 2, ABMS 109 may receive information 201-207 from various sources (and/or other suitable information) and may generate heatmaps 209 and/or 211 based on the information. In this example, assume that ABMS 109 receives information relating to UEs 101 that are present in a given geographic area, and that heatmaps 209 and 211 are associated with the given geographic area.

Information 201-207 may be used (e.g., during a "training" phase) to generate and/or modify battery usage models 111, and may also be used (e.g., during a "run-time" phase) to identify usage patterns of UEs 101 based on battery performance and/or charge metrics. In some embodiments, the training and/or run-time phases may include the use of AWL or other suitable techniques, such as K-means clustering, quantitative structure-activity relationship ("QSAR") analysis, Gaussian kernel ridge regression analysis, gradient regression analysis, Monte Carlo simulation, agent-based simulation, discrete event simulation, neural networks, and/or other suitable techniques. Such model generation and/or refinement may be based on, for example, a QSAR analysis based on battery parameters such as chemical formula (e.g., molecular weight, bond counts, etc.), sub-structural molecular components (e.g., fingerprints, fragments, bond acceptors, donors, etc.), molecular factors (e.g., topological descriptors, Eigen value descriptors), three-dimensional molecular spatial and/or geometric properties (e.g., stereo-spatial factors, atomic coordinates, comparative molecular field analysis, etc.), induced fit parameters to optimize charge optimization with porosity (e.g., flexible porous docking features), external physical effectors (e.g., temperature, pressure, stress, weight, load, etc.), and/or other parameters.

As shown, ABMS 109 may receive battery performance and/or charge metrics 201 (referred to herein as "battery performance metrics 201" for the sake of brevity) from one or more UEs 101 that are present in the geographic area. As noted above, battery performance metrics 201 may include metrics, parameters, etc. generated or received by BMS 105, such as SoC, dissipation rates, heat metrics, pressure metrics, cut-off thresholds, cooling times, and/or other battery-related metrics or configuration parameters. In some embodiments, battery performance metrics 201 may include make and/or model information associated with a given battery, and/or may describe parameters or characteristics of the battery (e.g., capacity, output voltage, output current, chemical composition and/or structure, etc.).

As noted above, battery usage models 111 may be further based on one or more other types of information, such as sensor data 203, RAN metrics and/or configuration information 205, locale features 207, and/or other types of information. Sensor data 203 may include, for example, sensor data detected by sensors of particular UEs 101, such as motion sensors (e.g., accelerometers, gyroscopes, infrared ("IR") motion sensors, or the like), thermometers, barometers, haptic sensors, and/or other types of sensors. In some embodiments, sensor data 203 may include information relating to the detection of neighboring devices, which may be determined using RF communications, such as by detecting broadcasts, beacons, or other wireless communications detected from neighboring devices. Such neighboring devices may include other UEs, IoT devices, M2M devices, WiFi access points, or the like.

RAN metrics and/or configuration information 205 may include information regarding one or more RANs that provide wireless coverage in the geographic area. RAN metrics and/or configuration information 205 may include, for example, information indicating available and/or used RF resources associated with one or more base stations (e.g., gNBs, eNBs, and/or types of base stations) that provide wireless coverage in the geographic area, a quantity of UEs 101 connected to respective base stations, performance and/or Quality of Service ("QoS") metrics associated with respective base stations (e.g., throughput, latency, jitter, indications of whether QoS thresholds are met, or the like), indications of network slices used by UEs 101 (e.g., where a "slice" refers to an instance of a network in which multiple instances are implemented or available), particular RATs and/or frequency bands used by UEs 101 to communicate with respective base stations, an antenna and/or beamforming configuration associated with respective base stations (e.g., directionality, beam width, beam power, etc.), and/or other information related to performance or configuration of one or more RANs that are present in the geographical area.

Locale features 207 may include information indicating attributes and/or features of the geographical area. For example, locale features 207 may include information relating to building layout and/or density, topographical features (e.g., mountains, valleys, forests, streams, etc.), weather-related information, air quality-related information (e.g., smog density, particulate density, fog density, etc.), and/or other factors that may affect how a given battery behaves (e.g., as such behavior pertains to SoC, discharge or dissipation rate, and/or other information associated with battery performance metrics 201). Locale features 207 may include geographical coordinates (e.g., latitude and longitude coordinates, Global Positioning System ("GPS") coordinates, or the like) or other suitable location information, to indicate the geographical locations of respective features.

Described above are some examples of types of information that ABMS 109 may receive in order to generate one or more battery usage models 111 (e.g., during a "training" phase) and/or to classify usage associated with real-time battery information (e.g., during a "run-time" phase). In practice one or more other types of information may be used by ABMS 109 in addition to, or in lieu of, the example types of information described above.

ABMS 109 may receive battery performance metrics 201 from multiple UEs 101. For example, ABMS 109 may receive battery performance metrics 201 from UEs 101 that are co-located (e.g., are located within the same geographic area), and/or from UEs 101 that are geographically diverse (e.g., are located in different geographic areas, such as different cities, states, provinces, or the like). As noted above, for this example, assume that ABMS 109 receives battery performance metrics 201 (and/or other information, such as UE sensor data 203) from multiple UEs that are located within the same geographic area.

ABMS 109 may generate heatmap 209 based on the information received from the UEs 101 (e.g., battery performance metrics 201, sensor data 203, and/or other information). In this example, the particular geographical area is represented as hexagons, where a particular hexagon defines a particular sub-area within the geographical area. In practice, ABMS 109 may divide or sub-divide the geographical area in some other fashion. Heatmap 209 may include different levels of shading to indicate different levels of "heat," where heat may refer to a given level of UE activity, as determined by generating battery models associated with UEs 101. For example, the battery models may be identified by comparing UE-level information (e.g., battery performance metrics 201, sensor data 203, etc.) to stored battery usage models 111, in order to determine the battery signatures and/or usage of UEs 101.

Different types of heatmaps may be generated by ABMS 109, which may be associated with different types of activity. For example, one type of heatmap may be associated with content streaming activity (e.g., where darker shading in a particular hexagon indicates more content streaming activity in a geographic area or sub-area corresponding to the particular hexagon), while another type of heatmap (e.g., generated based on the same information 201-207) may be associated with quantity of UEs 101 that are connected using a particular RAT or frequency band. In the latter example, darker shading in a particular hexagon may indicate a higher quantity of UEs 101 connected to the particular RAT or frequency band in the geographic area or sub-area corresponding to the particular hexagon.

For the sake of example, heatmaps 209 and 211 are described in the context of "usage." However, as noted above, various different types of heatmaps may be generated based on the same information, and may be associated with different types of UE usage, activity, behavior, etc. (e.g., types of services used, amounts of traffic sent and/or received, etc.).

In some embodiments, as noted above, ABMS 109 may further predict usage in the geographical area (and/or one or more other geographical areas, such as neighboring geographical areas), based on heatmap 209 (e.g., based on the information used to generate heatmap 209). For example, as shown, ABMS 109 may generate heatmap 211, indicating future usage associated with the geographical area. In some embodiments, for example, ABMS 109 may maintain one or more models relating to heatmaps (or other representations of UE usage patterns in a geographical area), and ABMS 109 may use such models to predict future usage in the area.

In the example of FIG. 2, heatmap 211 may represent the same geographical area as heatmap 209 at a different time, such as a time period immediately following a time period represented by heatmap 209, a time period one minute after the time period represented by heatmap 209, and so on. For example, heatmap 209 may reflect moderate to high levels of detected usage in certain sub-areas (e.g., as represented by the darkly shaded hexagons), while heatmap 211 may reflect a relatively highly concentrated area of future usage (e.g., as represented by the adjoining black or darkly shaded hexagons). As noted above, "usage" may refer to amounts of traffic sent and/or received by UEs 101 in respective geographic areas or sub-areas, quantities of UEs 101 connected to particular RATs or frequency bands of RANs that provide coverage in respective geographic areas or sub-areas, particular types of services or applications used by UEs 101 in particular geographic areas or sub-areas, etc.

Figure 3:
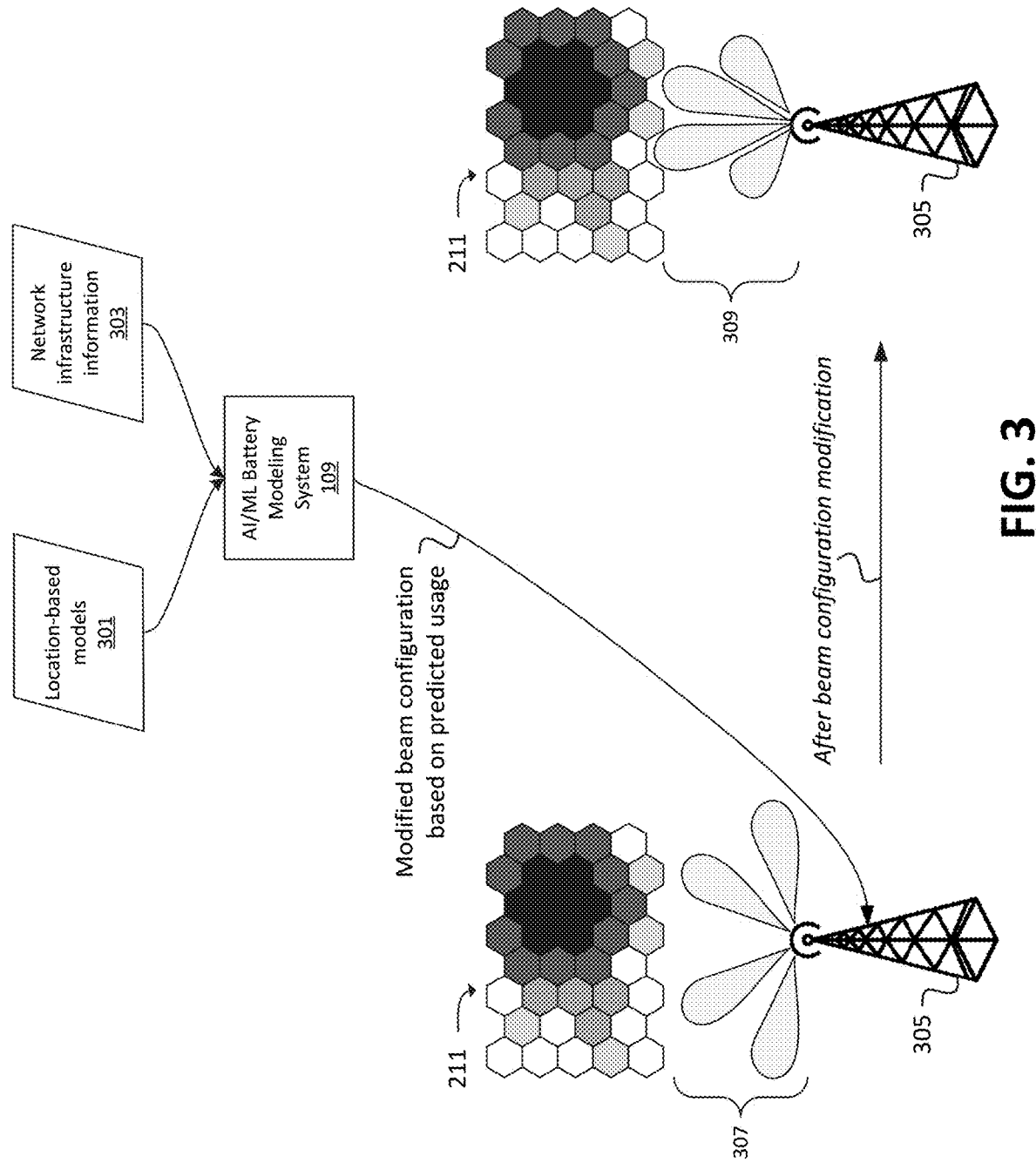
FIG. 3 illustrates an example of modifying a beamforming configuration associated with a wireless network based on UE usage information associated with a geographical area, in accordance with some embodiments.

As shown in FIG. 3, ABMS 109 may modify network parameters associated with certain geographic areas based on usage data associated with such areas, determined based on AI/ML or other suitable techniques used to determine such usage data based on battery usage information from respective UEs 101. As shown, for example, ABMS 109 may generate and/or receive location-based models 301, which may include heatmaps (such as heatmap 209, heatmap 211, etc., as described above) associated with particular geographic areas. ABMS 109 may also receive network infrastructure information 303, which may include information regarding locations, configurations, and/or other parameters of configurable network infrastructure elements, such as base stations, antennas, radios, or the like. In some embodiments, network infrastructure information 303 may include information including configuration parameters of MIMO antennas or other antennas, radios, etc. that have configurable parameters, such as directionality, beam width, antenna power, or the like.

For example, network infrastructure information 303 may indicate that a particular base station 305 has a coverage area that corresponds to some or all of the geographic area associated with heatmaps 209 and 211. Network infrastructure information 303 may further indicate that base station 305 is associated with a particular beam configuration 307. Network infrastructure information 303 may indicate, for example, directionality, width, power, etc. of one or more beams implemented by base station 305. Beam configuration 307 is conceptually represented in a simplified format in FIG. 3 for the sake of clarity and explanation, and for comparison to modified beam configuration 309 described below. In practice, beam configurations 307 and/or 309 may be different from the examples shown in FIG. 3. For example, in practice, base station 305 may implement additional or fewer beams, and/or the beams may be arranged differently than shown in FIG. 3.

As shown, ABMS 109 may output a modified beam configuration (e.g., modified beam configuration 309) to base station 305 based on predicted usage in the geographic area corresponding to base station 305. For example, as discussed above, ABMS 109 may determine a current and/or expected future usage of UEs 101 based on battery signatures associated with UEs 101, determined using AI/ML or other suitable techniques in accordance with some embodiments. For example, based on predicting increased usage at a particular geographic area or set of sub-areas (e.g., as indicated by the black shading in heatmap 211, as compared to heatmap 209), ABMS 109 may cause base station 305 to modify directionality, beam width, antenna power, and/or other aspects of beam configuration 307, resulting in modified beam configuration 309. Modified beam configuration 309 may provide enhanced QoS, performance, user experience, or the like to UEs 101 located in the geographic area, as compared to beam configuration 307. For example, modified beam configuration 309 may provide additional RF resources such that the coverage area associated with base station is more focused to the locations where predicted usage is expected to be higher.

While examples are described above in the context of modifying a beam configuration of base station 305, in some embodiments, other network parameters may be modified in response to usage patterns of UEs 101 determined based on battery signatures associated with UEs 101. For example, ABMS 109 may communicate with one or more Multi-Access/Mobile Edge Computing ("MEC") devices, referred to sometimes herein simply as ("MECs"), to provision additional MEC resources at locations corresponding to relatively increased usage in order to enhance services at such locations, and/or may cause MEC resources to be de-provisioned at locations correspond to relatively decreased usage in order to save resources.

As another example, ABMS 109 may modify queue weights and/or priorities at location-based models 301 in response to usage patterns determined based on battery signatures of UEs 101. For instance, based on battery signatures of UEs 101, ABMS 109 may determine that a relatively large quantity of voice calls are predicted in a particular geographic location. ABMS 109 may instruct base station 305 to prioritize voice call traffic (e.g., when allocating uplink or downlink Physical Resource Blocks ("PRBs")) over other types of traffic (e.g., content streaming traffic) based on the determined expected increased voice call usage.

Figure 4:
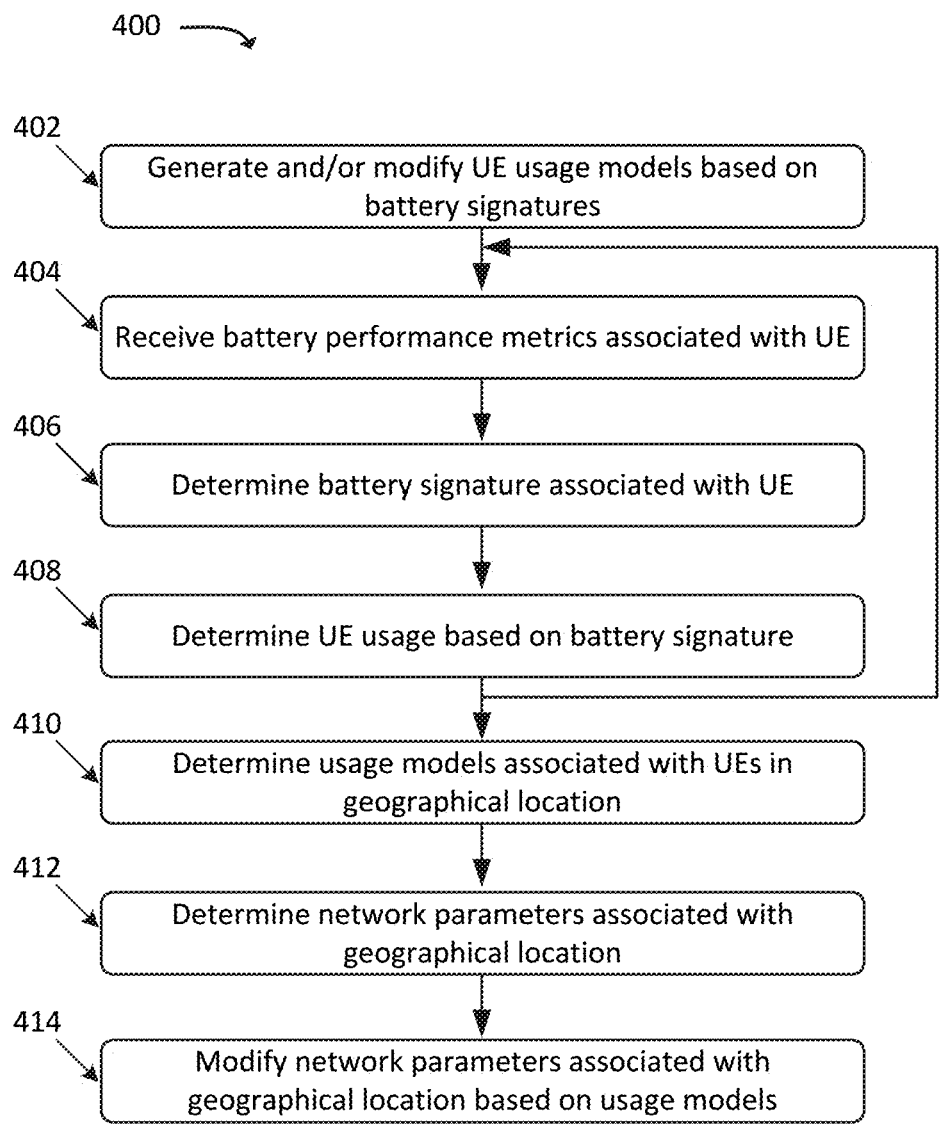
FIG. 4 illustrates an example process for modifying a network configuration based on UE usage information determined based on battery signatures associated with the UEs, in accordance with some embodiments.

FIG. 4 illustrates an example process 400 for modifying network parameters based on UE usage derived from battery signatures associated with UEs 101. In some embodiments, some or all of process 400 may be performed by ABMS 109. In some embodiments, one or more other devices may perform some or all of process 400 (e.g., in concert with, and/or in lieu of, ABMS 109).

As shown, process 400 may include generating and/or modifying (at 402) UE usage models based on battery signatures. For example, as discussed above, ABMS 109 may perform a "training" phase in which ABMS 109 generates and/or modifies UE usage models associated with different types of activity or usage, such as the use of particular applications or services, connecting and/or disconnecting to and/or from particular types of networks, communicating via particular RATs (e.g., LTE, 5G, WiFi, or other RATs), amounts of traffic sent and/or received, or the like. As noted above, UE usage models may be based on other factors, such as UE sensor data, network parameters, locale features, and/or other types of factors. For example, ABMS 109 may simulate some or all of the above factors, and/or may receive information regarding real-world usage as such real-world usage pertains to the above factors.

Process 400 may further include receiving (at 404) battery performance metrics associated with a particular UE 101. For example, as discussed above, ABMS 109 may receive such information from ABMS API 107, associated with UE 101, which may generate or receive the performance metrics from BMS 105 and/or battery 103. The performance metrics may include, for example, battery dissipation metrics, SoC metrics, rate of charge or discharge, heat metrics, pressure metrics, and/or other information associated with the performance, physical state, chemical composition, etc. of battery 103 associated with UE 101. In some embodiments, ABMS 109 may further receive or determine attributes of battery 103, such as a make, model, output current, output voltage, capacity, or the like.

In some embodiments, ABMS 109 may receive additional information from or associated with UE 101, such as sensor data from UE 101, location information associated with UE 101, RAN configuration and/or performance information associated with one or more RANs that provide coverage in a location at which UE 101 is located, locale feature information associated with the location at which UE 101 is located, and/or other suitable information.

Process 400 may additionally include determining (at 406) a battery signature associated with UE 101 based on the received performance metrics. For example, ABMS 109 may determine patterns, trends, or the like over time, based on the received performance metrics. In some embodiments, the battery signature may further be based on information in addition to performance metrics, such as UE sensor information, UE location information, etc., as discussed above. The battery signature may be associated with, for example, particular metrics over time, such as a relatively high rate of discharge and high temperature over a first time interval, and a relatively lower rate of discharge and a relatively lower temperature over a second time interval. In practice, the battery signature may be associated with other metrics in addition to, or in lieu of, rate of discharge and temperature.

Process 400 may also include determining (at 408) UE usage, associated with UE 101, based on the battery signature. For example, ABMS 109 may compare the battery signature (determined at 406) to one or more UE usage models (as generated or modified at 402), to determine one or more matching usage models. The term "match" may refer to an exact match, and/or may refer to a result of a suitable similarity or correlation analysis between portions or the entirety of the battery signature and the usage models. For example, the term "match" may refer to the identification or selection of a UE usage model that most closely matches the battery signature out of the group of stored UE usage models, and/or where a measure of similarity between the UE usage model and the battery signature exceeds a threshold measure of similarity.

In some embodiments, some or all of process 400 may be repeated iteratively, and/or performed in parallel for multiple UEs 101. For example, as shown in FIG. 4, blocks 404-408 may be performed for multiple UEs 101, such as UEs 101 located within a particular geographical area. For example, based on the performance of blocks 404-408 for multiple UEs 101 located within the particular geographical area, ABMS 109 may determine (at 410) usage models associated with multiple UEs 101 located within the geographical area. In this manner, ABMS 109 may generate one or more heatmaps or other representations of the usage of UEs 101 in the geographical area. As discussed above, the heatmaps or other representations may be based on received battery performance information, and/or may reflect predicted UE usage in the geographical area.

Process 400 may additionally include determining (at 412) network parameters associated with the geographical location. For example, as discussed above, ABMS 109 may receive network parameters associated with one or more base stations, radios, antennas, MEC resources, and/or other types of network infrastructure that is located in or that serves the particular geographical area. In some embodiments, such network parameters may include antenna parameters (e.g., parameters associated with MIMO antennas or other configurable antennas), such as azimuth angle, beam width, antenna power, etc.

Process 400 may also include modifying (at 414) network parameters associated with the geographical location based on the determined usage models. For example, as discussed above, ABMS 109 may modify beam configurations of antennas that serve the geographical location, may provision or de-provision MEC resources associated with the geographical location, and/or perform other network parameter modifications.

Figure 5:
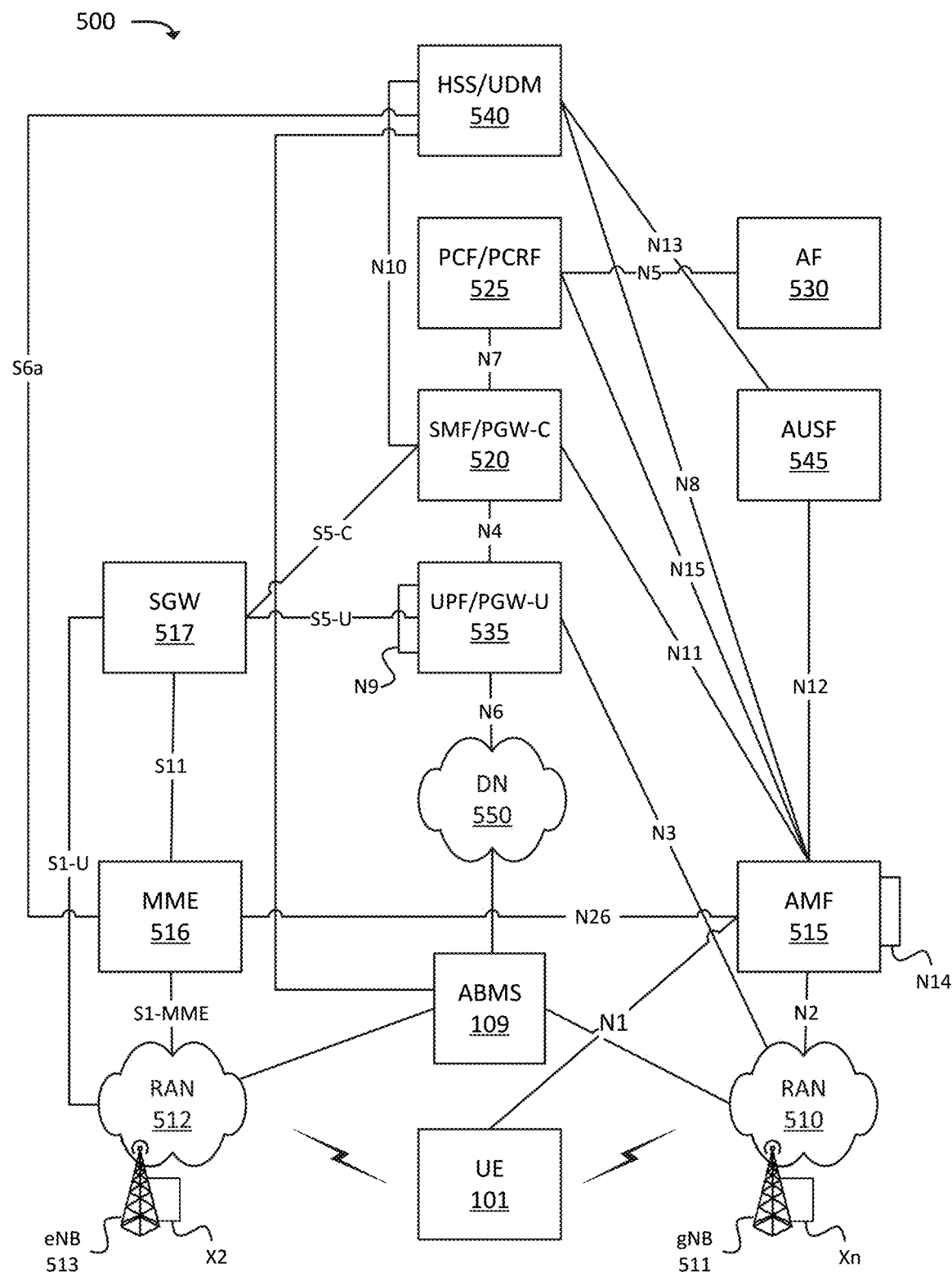
FIG. 5 illustrates an example environment in which one or more embodiments, described herein, may be implemented.

FIG. 5 illustrates an example environment 500, in which one or more embodiments may be implemented. In some embodiments, environment 500 may correspond to a 5G network, and/or may include elements of a 5G network. In some embodiments, environment 500 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 500 may include UE 101, RAN 510 (which may include one or more Next Generation Node Bs ("gNBs") 511), RAN 512 (which may include one or more one or more evolved Node Bs ("eNBs") 513), and various network functions such as Access and Mobility Management Function ("AMF") 515, Mobility Management Entity ("MIME") 516, Serving Gateway ("SGW") 517, Session Management Function ("SMF")/Packet Data Network ("PDN") Gateway ("PGW")-Control plane function ("PGW-C") 520, Policy Control Function ("PCF")/Policy Charging and Rules Function ("PCRF") 525, Application Function ("AF") 530, User Plane Function ("UPF")/PGW-User plane function ("PGW-U") 535, Home Subscriber Server ("HSS")/Unified Data Management ("UDM") 540, Authentication Server Function ("AUSF") 545, and ABMS 109. Environment 500 may also include one or more networks, such as Data Network ("DN") 550.

The example shown in FIG. 5 illustrates one instance of each network component or function (e.g., one instance of SMF/PGW-C 520, PCF/PCRF 525, UPF/PGW-U 535, HSS/UDM 540, and/or 545). In practice, environment 500 may include multiple instances of such components or functions. For example, in some embodiments, environment 500 may include multiple "slices" of a core network, where each slice includes a discrete set of network functions (e.g., one slice may include a first instance of SMF/PGW-C 520, PCF/PCRF 525, UPF/PGW-U 535, HSS/UDM 540, and/or 545, while another slice may include a second instance of SMF/PGW-C 520, PCF/PCRF 525, UPF/PGW-U 535, HSS/UDM 540, and/or 545). The different slices may provide differentiated levels of service, such as service in accordance with different Quality of Service ("QoS") parameters.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more network functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 101 may include a computation and communication device, such as a wireless mobile communication device that is capable of communicating with RAN 510, RAN 512, and/or DN 550. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 101 may send traffic to and/or receive traffic (e.g., user plane traffic) from DN 550 via RAN 510, RAN 512, and/or UPF/PGW-U 535.

RAN 510 may be, or may include, a 5G RAN that includes one or more base stations (e.g., one or more gNBs 511), via which UE 101 may communicate with one or more other elements of environment 500. UE 101 may communicate with RAN 510 via an air interface (e.g., as provided by gNB 511). For instance, RAN 510 may receive traffic (e.g., voice call traffic, data traffic, messaging traffic, signaling traffic, etc.) from UE 101 via the air interface, and may communicate the traffic to UPF/PGW-U 535, and/or one or more other devices or networks. Similarly, RAN 510 may receive traffic intended for UE 101 (e.g., from UPF/PGW-U 535, AMF 515, and/or one or more other devices or networks) and may communicate the traffic to UE 101 via the air interface.

RAN 512 may be, or may include, a LTE RAN that includes one or more base stations (e.g., one or more eNBs 513), via which UE 101 may communicate with one or more other elements of environment 500. UE 101 may communicate with RAN 512 via an air interface (e.g., as provided by eNB 513). For instance, RAN 510 may receive traffic (e.g., voice call traffic, data traffic, messaging traffic, signaling traffic, etc.) from UE 101 via the air interface, and may communicate the traffic to UPF/PGW-U 535, and/or one or more other devices or networks. Similarly, RAN 510 may receive traffic intended for UE 101 (e.g., from UPF/PGW-U 535, SGW 517, and/or one or more other devices or networks) and may communicate the traffic to UE 101 via the air interface.

AMF 515 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 510 and/or gNBs 511, and/or to perform other operations. In some embodiments, the 5G network may include multiple AMFs 515, which communicate with each other via the N14 interface (denoted in FIG. 5 by the line marked "N14" originating and terminating at AMF 515).

MME 516 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 512 and/or eNBs 513, and/or to perform other operations.

SGW 517 may include one or more devices, systems, VNFs, etc., that aggregate traffic received from one or more eNBs 513 and send the aggregated traffic to an external network or device via UPF/PGW-U 535. Additionally, SGW 517 may aggregate traffic received from one or more UPF/PGW-Us 535 and may send the aggregated traffic to one or more eNBs 513. SGW 517 may operate as an anchor for the user plane during inter-eNB handovers and as an anchor for mobility between different telecommunication networks or RANs (e.g., RANs 510 and 512).

SMF/PGW-C 520 may include one or more devices, systems, VNFs, etc., that gather, process, store, and/or provide information in a manner described herein. SMF/PGW-C 520 may, for example, facilitate in the establishment of communication sessions on behalf of UE 101. In some embodiments, the establishment of communications sessions may be performed in accordance with one or more policies provided by PCF/PCRF 525.

PCF/PCRF 525 may include one or more devices, systems, VNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525).

AF 530 may include one or more devices, systems, VNFs, etc., that receive, store, and/or provide information that may be used in determining parameters (e.g., quality of service parameters, charging parameters, or the like) for certain applications.

UPF/PGW-U 535 may include one or more devices, systems, VNFs, etc., that receive, store, and/or provide data (e.g., user plane data). For example, UPF/PGW-U 535 may receive user plane data (e.g., voice call traffic, data traffic, etc.), destined for UE 101, from DN 550, and may forward the user plane data toward UE 101 (e.g., via RAN 510, SMF/PGW-C 520, and/or one or more other devices). In some embodiments, multiple UPFs 535 may be deployed (e.g., in different geographical locations), and the delivery of content to UE 101 may be coordinated via the N9 interface (e.g., as denoted in FIG. 5 by the line marked "N9" originating and terminating at UPF/PGW-U 535). Similarly, UPF/PGW-U 535 may receive traffic from UE 101 (e.g., via RAN 510, SMF/PGW-C 520, and/or one or more other devices), and may forward the traffic toward DN 550. In some embodiments, UPF/PGW-U 535 may communicate (e.g., via the N4 interface) with SMF/PGW-C 520, regarding user plane data processed by UPF/PGW-U 535.

HSS/UDM 540 and AUSF 545 may include one or more devices, systems, VNFs, etc., that manage, update, and/or store, in one or more memory devices associated with AUSF 545 and/or HSS/UDM 540, profile information associated with a subscriber. AUSF 545 and/or HSS/UDM 540 may perform authentication, authorization, and/or accounting operations associated with the subscriber and/or a communication session with UE 101.

ABMS 109 may include one or more devices, systems, VNFs, etc., that perform one or more operations described above. For example, ABMS 109 may communicate with UEs 101 via RAN 510, RAN 512, DN 550, or some other network. In some embodiments, ABMS 109 may be implemented via a cloud computing system or some other suitable device or collection of devices. As discussed above, ABMS 109 may determine battery signatures and/or usage information based on information received from UEs 101. In some embodiments, ABMS 109 may communicate with RAN 510 and/or RAN 512, in order to modify network parameters (e.g., beam configurations, resource allocation parameters, queueing parameters, or other network parameters) associated with RAN 510 and/or 512, based on UE usage determined based on battery signatures associated with respective UEs 101. In some embodiments, ABMS 109 may communicate with HSS/UDM 540 and/or one or more other network elements, in order to identify or authenticate particular ABMS 109 and/or UEs 101, and/or perform other suitable functions.

DN 550 may include one or more wired and/or wireless networks. For example, DN 550 may include an Internet Protocol ("IP")-based PDN, a wide area network ("WAN") such as the Internet, a private enterprise network, and/or one or more other networks. UE 101 may communicate, through DN 550, with data servers, other UEs 101, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 101 may communicate.

Figure 6:
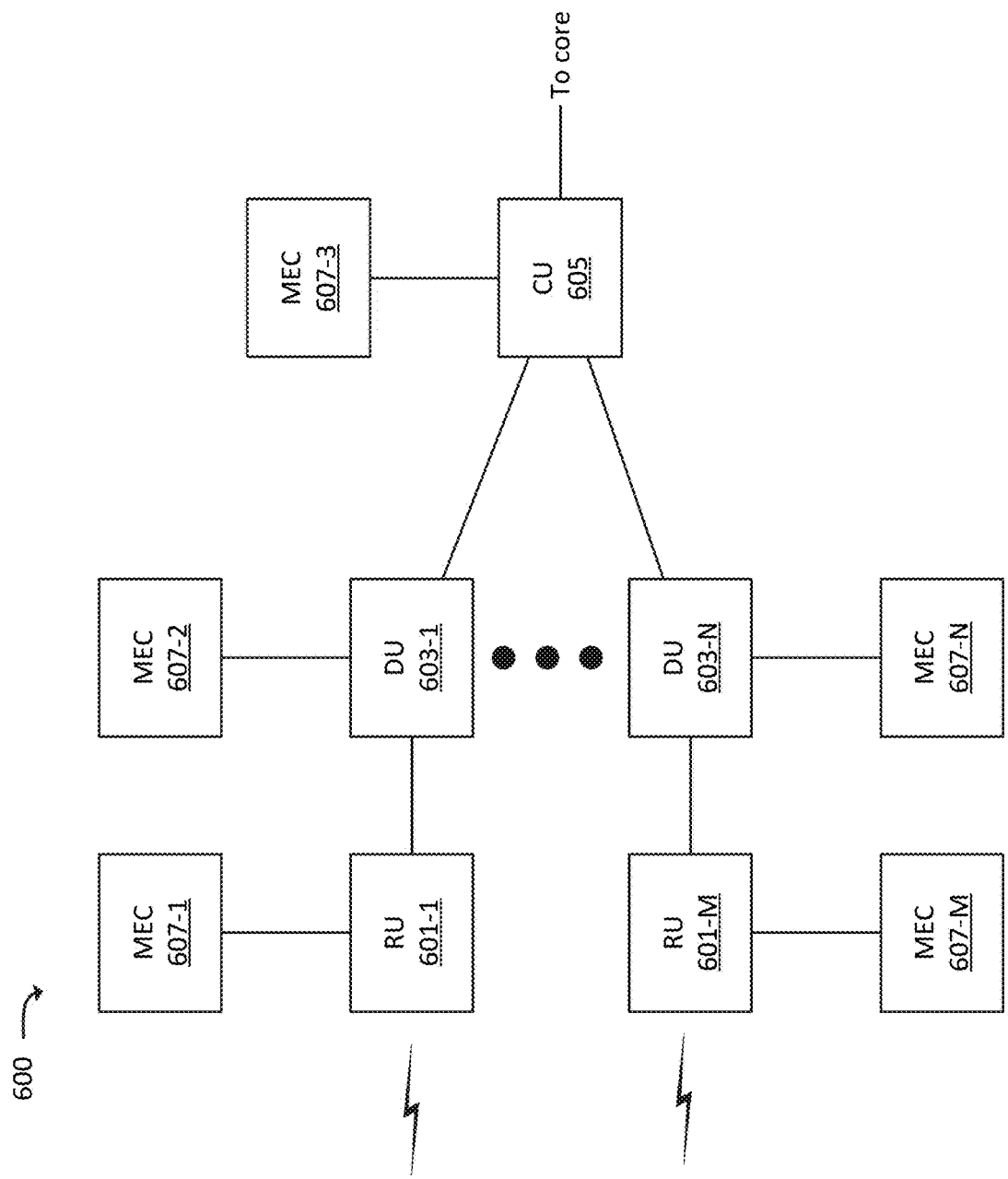
FIG. 6 illustrates an example arrangement of a radio access network ("RAN"), in accordance with some embodiments.

FIG. 6 illustrates an example Distributed Unit ("DU") network 600, which may be included in and/or implemented by one or more RANs (e.g., RAN 510). In some embodiments, a particular RAN may include one DU network 600. In some embodiments, a particular RAN may include multiple DU networks 600. In some embodiments, DU network 600 may correspond to a particular gNB 511 of a 5G RAN (e.g., RAN 510). In some embodiments, DU network 600 may correspond to multiple gNBs 511. In some embodiments, DU network 600 may correspond to one or more other types of base stations of one or more other types of RANs. As shown, DU network 600 may include Central Unit ("CU") 605, one or more Distributed Units ("DUs") 603-1 through 603-N (referred to individually as "DU 603," or collectively as "DUs 603"), and one or more Radio Units ("RUs") 601-1 through 601-M (referred to individually as "RU 601," or collectively as "RUs 601").

CU 605 may communicate with a core of a wireless network (e.g., may communicate with one or more of the devices or systems described above with respect to FIG. 5, such as AMF 515 and/or UPF/PGW-U 535). In the uplink direction (e.g., for traffic from UEs 101 to a core network), CU 605 may aggregate traffic from DUs 603, and forward the aggregated traffic to the core network. In some embodiments, CU 605 may receive traffic according to a given protocol (e.g., Radio Link Control ("RLC")) from DUs 603, and may perform higher-layer processing (e.g., may aggregate/process RLC packets and generate Packet Data Convergence Protocol ("PDCP") packets based on the RLC packets) on the traffic received from DUs 603.

In accordance with some embodiments, CU 605 may receive downlink traffic (e.g., traffic from the core network) for a particular UE 101, and may determine which DU(s) 603 should receive the downlink traffic. DU 603 may include one or more devices that transmit traffic between a core network (e.g., via CU 605) and UE 101 (e.g., via a respective RU 601). DU 603 may, for example, receive traffic from RU 601 at a first layer (e.g., physical ("PHY") layer traffic, or lower PHY layer traffic), and may process/aggregate the traffic to a second layer (e.g., upper PHY and/or RLC). DU 603 may receive traffic from CU 605 at the second layer, may process the traffic to the first layer, and provide the processed traffic to a respective RU 601 for transmission to UE 101.

RU 601 may include hardware circuitry (e.g., one or more RF transceivers, antennas, radios, and/or other suitable hardware) to communicate wirelessly (e.g., via an RF interface) with one or more UEs 101, one or more other DUs 603 (e.g., via RUs 601 associated with DUs 603), and/or any other suitable type of device. In the uplink direction, RU 601 may receive traffic from UE 101 and/or another DU 603 via the RF interface and may provide the traffic to DU 603. In the downlink direction, RU 601 may receive traffic from DU 603, and may provide the traffic to UE 101 and/or another DU 603.

RUs 601 may, in some embodiments, be communicatively coupled to one or more Multi-Access/Mobile Edge Computing ("MEC") devices, referred to sometimes herein simply as ("MECs") 607. For example, RU 601-1 may be communicatively coupled to MEC 607-1, RU 601-M may be communicatively coupled to MEC 607-M, DU 603-1 may be communicatively coupled to MEC 607-2, DU 603-N may be communicatively coupled to MEC 607-N, CU 605 may be communicatively coupled to MEC 607-3, and so on. MECs 607 may include hardware resources (e.g., configurable or provisionable hardware resources) that may be configured to provide services and/or otherwise process traffic to and/or from UE 101, via a respective RU 601.

For example, RU 601-1 may route some traffic, from UE 101, to MEC 607-1 instead of to a core network (e.g., via DU 603 and CU 605). MEC 607-1 may process the traffic, perform one or more computations based on the received traffic, and may provide traffic to UE 101 via RU 601-1. In this manner, ultra-low latency services may be provided to UE 101, as traffic does not need to traverse DU 603, CU 605, and an intervening backhaul network between DU network 600 and the core network. In some embodiments, MEC 607 may include, and/or may implement some or all of the functionality described above with respect to ABMS 109.

Figure 7:
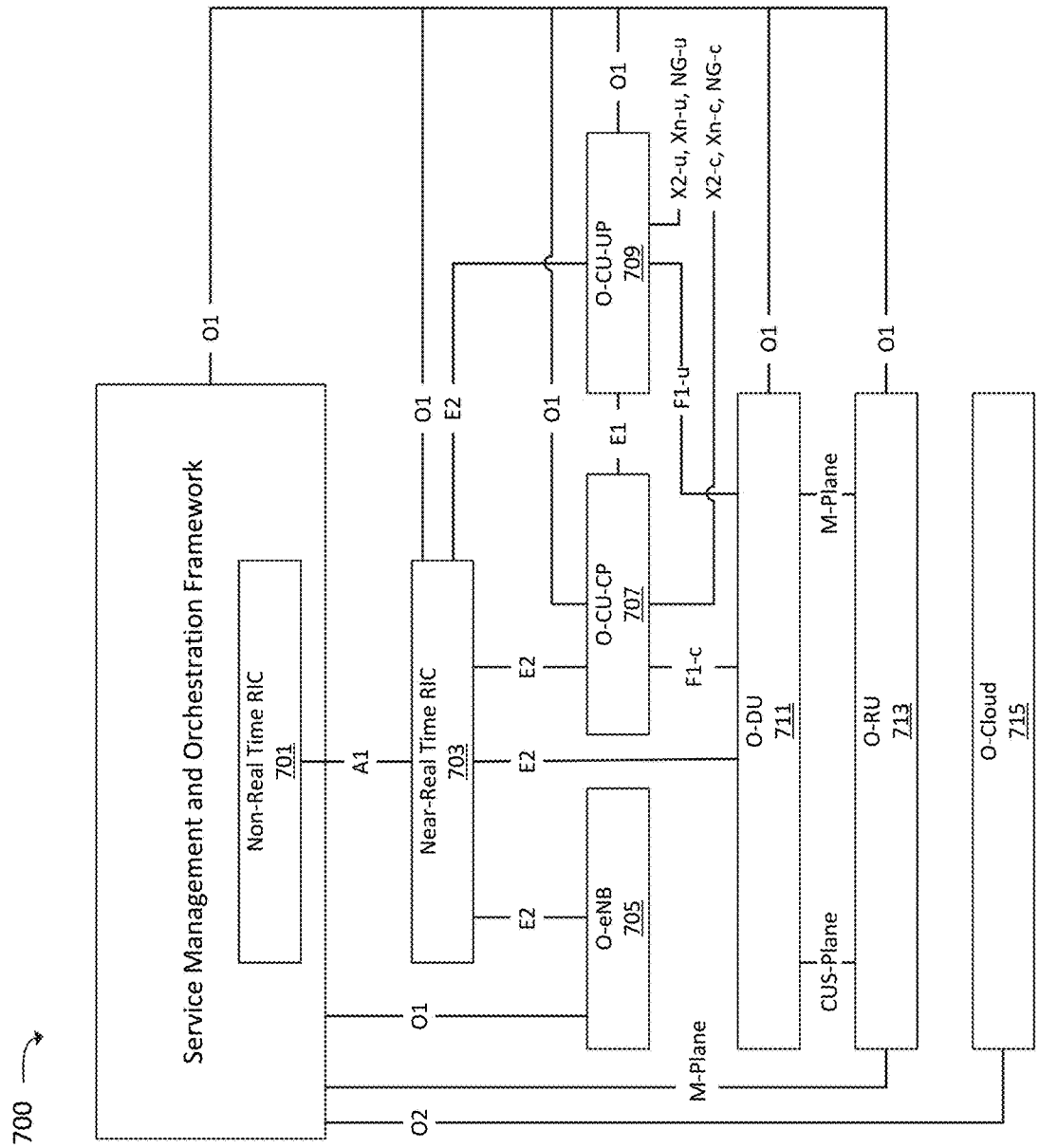
FIG. 7 illustrates an example arrangement of an Open RAN ("O-RAN") environment in which one or more embodiments, described herein, may be implemented.

FIG. 7 illustrates an example O-RAN environment 700, which may correspond to RAN 510, RAN 512, and/or DU network 600. For example, RAN 510, RAN 512, and/or DU network 600 may include one or more instances of O-RAN environment 700, and/or one or more instances of O-RAN environment 700 may implement RAN 510, RAN 512, DU network 600, and/or some portion thereof. As shown, O-RAN environment 700 may include Non-Real Time Radio Intelligent Controller ("RIC") 701, Near-Real Time RIC 703, O-eNB 705, O-CU-Control Plane ("O-CU-CP") 707, O-CU-User Plane ("O-CU-UP") 709, O-DU 711, O-RU 713, and O-Cloud 715. In some embodiments, O-RAN environment 700 may include additional, fewer, different, and/or differently arranged components.

In some embodiments, some or all of the elements of O-RAN environment 700 may be implemented by one or more configurable or provisionable resources, such as virtual machines, cloud computing systems, physical servers, and/or other types of configurable or provisionable resources. In some embodiments, some or all of O-RAN environment 700 may be implemented by, and/or communicatively coupled to, one or more MECs 607.

Non-Real Time RIC 701 and Near-Real Time RIC 703 may receive performance information (and/or other types of information) from one or more sources, and may configure other elements of O-RAN environment 700 based on such performance or other information. For example, Near-Real Time RIC 703 may receive performance information, via one or more E2 interfaces, from O-eNB 705, O-CU-CP 707, and/or O-CU-UP 709, and may modify parameters associated with O-eNB 705, O-CU-CP 707, and/or O-CU-UP 709 based on such performance information. Similarly, Non-Real Time RIC 701 may receive performance information associated with O-eNB 705, O-CU-CP 707, O-CU-UP 709, and/or one or more other elements of O-RAN environment 700 and may utilize machine learning and/or other higher level computing or processing to determine modifications to the configuration of O-eNB 705, O-CU-CP 707, O-CU-UP 709, and/or other elements of O-RAN environment 700. In some embodiments, Non-Real Time RIC 701 may generate machine learning models based on performance information associated with O-RAN environment 700 or other sources, and may provide such models to Near-Real Time RIC 703 for implementation.

O-eNB 705 may perform functions similar to those described above with respect to eNB 513. For example, O-eNB 705 may facilitate wireless communications between UE 101 and a core network. O-CU-CP 707 may perform control plane signaling to coordinate the aggregation and/or distribution of traffic via one or more DUs 603, which may include and/or be implemented by one or more O-DUs 711, and O-CU-UP 709 may perform the aggregation and/or distribution of traffic via such DUs 603 (e.g., O-DUs 711). O-DU 711 may be communicatively coupled to one or more RUs 601, which may include and/or may be implemented by one or more O-RUs 713. In some embodiments, O-Cloud 715 may include or be implemented by one or more MECs 607, which may provide services, and may be communicatively coupled, to O-CU-CP 707, O-CU-UP 709, O-DU 711, and/or O-RU 713 (e.g., via an O1 and/or O2 interface).

Figure 8:
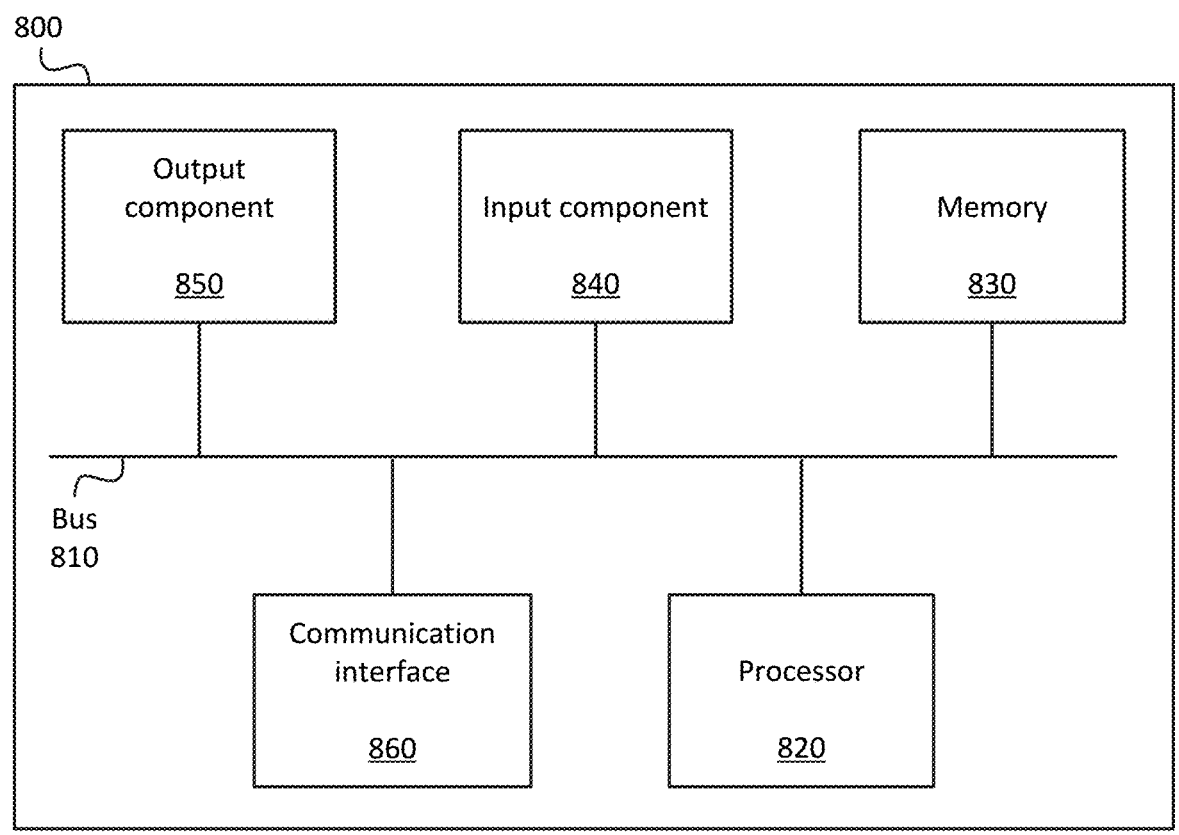
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or other receives or detects input from a source external to 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a GPS-based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
generate or receive a plurality of battery usage models, wherein a particular battery usage model, of the plurality of battery usage models, is associated with:
a particular type of battery installed in a particular User Equipment ("UE"),
a set of activities performed by the particular UE, while the particular battery is installed in the particular UE, over a particular period of time, and
a set of battery performance metrics associated with the battery over the particular period of time;
receive battery performance metrics associated with a plurality of UEs associated with a wireless network;
determine, based on the received battery performance metrics associated with the plurality of UEs and further based on the plurality of battery usage models, UE usage information associated with the wireless network;
determine a set of network parameters based on the UE usage information; and
modify one or more parameters of the wireless network based on the set of determined network parameters.

2. The device of claim 1, wherein the set of battery performance metrics associated with the plurality of UEs include battery performance metrics determined or received by a respective battery management system of each UE of the plurality of UEs.

3. The device of claim 1, wherein the set of battery performance metrics associated with the plurality of UEs include at least one of:
a state of charge,
a temperature,
a pressure,
a cooling time,
a Peukert Curve,
an energy and power Ragone plot, or
a cycle life.

4. The device of claim 1, wherein generating the plurality of battery usage models includes performing one or more simulations of the set of activities to train the battery usage models.

5. The device of claim 1, wherein modifying the one or more parameters includes modifying a beam configuration of one or more antennas associated with the wireless network.

6. The device of claim 5, wherein modifying the beam configuration of the one or more antennas associated with the wireless network includes modifying a beam configuration of a set of Multiple-Input Multiple-Output ("MIMO") antennas associated with a base station of the wireless network.

7. The device of claim 1, wherein the plurality of UEs are associated with a particular geographical area, wherein modifying the one or more parameters of the wireless network include modifying one or more parameters of a base station that is associated with a coverage area that includes the particular geographical area.

8. A non-transitory computer-readable medium, storing a plurality of processor-executable instructions to:
generate or receive a plurality of battery usage models, wherein a particular battery usage model, of the plurality of battery usage models, is associated with:
a particular type of battery installed in a particular User Equipment ("UE"),
a set of activities performed by the particular UE, while the particular battery is installed in the particular UE, over a particular period of time, and
a set of battery performance metrics associated with the battery over the particular period of time;
receive battery performance metrics associated with a plurality of UEs associated with a wireless network;
determine, based on the received battery performance metrics associated with the plurality of UEs and further based on the plurality of battery usage models, UE usage information associated with the wireless network;
determine a set of network parameters based on the UE usage information; and
modify one or more parameters of the wireless network based on the set of determined network parameters.

9. The non-transitory computer-readable medium of claim 8, wherein the set of battery performance metrics associated with the plurality of UEs include battery performance metrics determined or received by a respective battery management system of each UE of the plurality of UEs.

10. The non-transitory computer-readable medium of claim 8, wherein the set of battery performance metrics associated with the plurality of UEs include at least one of:
a state of charge,
a temperature,
a pressure,
a cooling time,
a Peukert Curve,
an energy and power Ragone plot, or
a cycle life.

11. The non-transitory computer-readable medium of claim 8, wherein generating the plurality of battery usage models includes performing one or more simulations of the set of activities to train the battery usage models.

12. The non-transitory computer-readable medium of claim 8, wherein modifying the one or more parameters includes modifying a beam configuration of one or more antennas associated with the wireless network.

13. The non-transitory computer-readable medium of claim 12, wherein modifying the beam configuration of the one or more antennas associated with the wireless network includes modifying a beam configuration of a set of Multiple-Input Multiple-Output ("MIMO") antennas associated with a base station of the wireless network.

14. The non-transitory computer-readable medium of claim 8, wherein the plurality of UEs are associated with a particular geographical area, wherein modifying the one or more parameters of the wireless network include modifying one or more parameters of a base station that is associated with a coverage area that includes the particular geographical area.

15. A method, comprising:
generating or receiving a plurality of battery usage models, wherein a particular battery usage model, of the plurality of battery usage models, is associated with:
a particular type of battery installed in a particular User Equipment ("UE"),
a set of activities performed by the particular UE, while the particular battery is installed in the particular UE, over a particular period of time, and
a set of battery performance metrics associated with the battery over the particular period of time;
receiving battery performance metrics associated with a plurality of UEs associated with a wireless network;
determining, based on the received battery performance metrics associated with the plurality of UEs and further based on the plurality of battery usage models, UE usage information associated with the wireless network;
determining a set of network parameters based on the UE usage information; and
modifying one or more parameters of the wireless network based on the set of determined network parameters.

16. The method of claim 15, wherein the set of battery performance metrics associated with the plurality of UEs include battery performance metrics determined or received by a respective battery management system of each UE of the plurality of UEs.

17. The method of claim 15, wherein the set of battery performance metrics associated with the plurality of UEs include at least one of:
a state of charge,
a temperature,
a pressure,
a cooling time,
a Peukert Curve,
an energy and power Ragone plot, or
a cycle life.

18. The method of claim 15, wherein generating the plurality of battery usage models includes performing one or more simulations of the set of activities to train the battery usage models.

19. The method of claim 15, wherein modifying the one or more parameters includes modifying a beam configuration of a set of Multiple-Input Multiple-Output ("MIMO") antennas associated with a base station of the wireless network.

20. The method of claim 15, wherein the plurality of UEs are associated with a particular geographical area, wherein modifying the one or more parameters of the wireless network include modifying one or more parameters of a base station that is associated with a coverage area that includes the particular geographical area.

* * * * *